United States Patent [19]

Inoue et al.

[11] Patent Number: 5,340,872

[45] Date of Patent: Aug. 23, 1994

[54] SILICONE RUBBER COMPOSITIONS AND THEIR CURED PRODUCTS

[75] Inventors: Yoshio Inoue; Masachika Yoshino, both of Annaka, Japan

[73] Assignee: Shin-Etsu Chemical Co., Ltd., Tokyo, Japan

[21] Appl. No.: 65,269

[22] Filed: May 21, 1993

[30] Foreign Application Priority Data

May 22, 1992 [JP] Japan .................... 4-155810

[51] Int. Cl.$^5$ .................... C08G 77/26; C08K 5/54
[52] U.S. Cl. .................... 524/588; 528/38; 528/31; 528/15; 528/24; 525/477; 525/479
[58] Field of Search ............ 524/588; 528/38, 15, 528/31, 24; 525/477, 479

[56] References Cited

U.S. PATENT DOCUMENTS 3,243,404  3/1966  Martellock ............. 528/38
4,678,688  7/1987  Itoh et al. ............. 427/387

FOREIGN PATENT DOCUMENTS 764530  8/1967  Canada .

*Primary Examiner*—John C. Bleutge
*Assistant Examiner*—Margaret W. Glass

*Attorney, Agent, or Firm*—Millen, White, Zelano, & Branigan

[57] ABSTRACT

Silicone rubber compositions which comprise (A) an organopolysiloxane, which possesses at least one triorganosilyl-amine group expressed by the following equation (1) at its molecular end and a degree of polymerization which is at least 2000, and the silicone rubber compositions which further comprise (B) a fine powdered silica whose specific surface area is at least 50 m²/g,

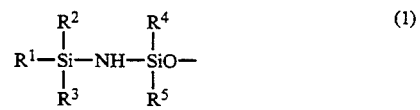

(1)

wherein $R^1$, $R^2$, $R^3$, $R^4$ and $R^5$ are each a substituted or unsubstituted monovalent hydrocarbon group, each of which can be the same or different. The silicone rubber compositions are a non-fluidity type; therefore, they offer superior workability and formability. Further, silicone rubber obtained by the curing of the said compositions possess superior physical properties, extremely low hardness, flexibility, and good rubber elasticity, thus they are useful as raw materials of various products.

9 Claims, No Drawings

SILICONE RUBBER COMPOSITIONS AND THEIR CURED PRODUCTS

BACKGROUND OF THE INVENTION

This invention relates to silicone rubber compositions of a non-fluidity type, which have superior workability and formability and further are capable of producing silicone rubber cured products which form elastomers with an extremely low hardness.

Silicone rubber compositions are usually prepared by the addition of fillers, process assisting agents and vulcanization agents into silicone polymers (a raw rubber). The cured products of such silicone rubber compositions (silicone rubbers) are superior in heat resistance, weather resistance, durability, mold releasing characteristics, and electrical properties. Therefore, they are processed and finished into many shapes and are utilized in various fields as construction materials, electric and electronic parts, automotive parts, OA instrument parts, and domestic wares including food containers, rice cookers and insulated containers.

Application of silica as a filler, in this case, provides a reinforcing effect, resulting in silicone rubbers with superior physical properties. An increased ratio of the silica fillers improves the physical properties; however, it also increases the hardness of the silicone rubber products. Recently, lower hardness (JIS-A hardness of at most 40) silicone rubbers, which are obtained by the curing of silicone rubber compositions with a very small amount of reinforcing silica fillers, were found to possess superior flexibility and rubber elasticity. These characteristics are difficult to achieve with the conventional high hardness silicone rubbers; therefore, these lower hardness silicone rubbers have begun to be utilized as a raw material for rolls, vibration controllers, and vibration preventers.

However, the reduced amount of reinforcing silica fillers not only makes the silicone rubber compositions more sticky and lowers their roll workability, but also causes fluidity in the compositions and lowers the formability, for example, by making uniform extrusion molding more difficult.

SUMMARY OF THE INVENTION

This invention solves the above problems. An object of the invention is to provide silicone rubber compositions of a non-fluidity type having superior workability and formability, and further which are capable of producing cured products with an extremely low hardness.

Another object of the invention is to provide cured products of said compositions.

Upon further study of the specification and appended claims, further objects and advantages of this invention will become apparent to those skilled in the art.

In order to achieve these objectives, the inventors have discovered that, when silicone rubber compositions are obtained by the employment of (A) an organopolysiloxane, which possesses at least one triorganosilyl amine group expressed by the following equation (1) at its molecular end(s) and a degree of polymerization of which is at least 2000, as a silicone raw rubber and by adding (B) a fine powdered silica whose specific surface area is at least 50 m²/g, the resultant compositions are of a non-fluidity type prior to their curing. Therefore, they have no or only very low adherence onto the rolls, giving them superior roll workability. They can also be made into precision sized products by the extrusion molding process. The products by the injection molding process possess a smaller degree of burrs since they can be confined within the mold cavity without leakage. Further, their cured products are superior in heat resistance and weather resistance and are capable of preparing elastomer products with an extremely low hardness.

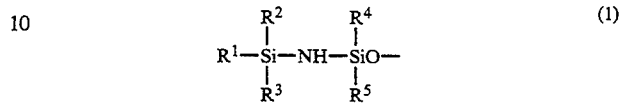

wherein $R^1$, $R^2$, $R^3$, $R^4$ and $R^5$ are each a hydrogen atom or a substituted or unsubstituted monovalent hydrocarbon group, each of which can be the same or different.

Therefore, this invention offers the silicone rubber compositions which comprise (A) an organopolysiloxane, which possesses at least one triorganosilyl amine group expressed by the above equation (1) at its molecular end(s) and a degree of polymerization of which is at least 2000, and in addition, (B) fine powdered silica whose specific surface area is at least 50 m²/g, and the silicone rubber cured products which are prepared by curing said silicone rubber compositions. The invention is particularly effective for providing silicone gum compositions having low hardness of, at most, JIS-A hardness 40, which can be compounded with a very small amount of fine powder silica.

Below, this invention is explained further in detail. The silicone rubber compositions of this invention comprise (A) an organopolysiloxane as a major constituent.

DETAILED DESCRIPTION OF THE INVENTION

Component (A), an organopolysiloxane, possesses at least one triorganosilyl amine group expressed, for example, by the following equation (1) at its molecular end(s).

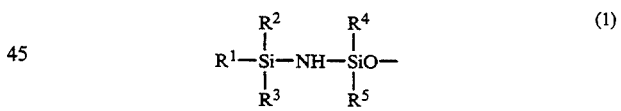

In this equation, $R^1$, $R^2$, $R^3$, $R^4$ and $R^5$ are each a hydrogen atom or a substituted or unsubstituted monovalent hydrocarbon group, each of which can be the same or different. The number of carbon atoms in these groups is preferably in the range from 1 to 10. Examples of the optional substituents on the R groups include halogens and cyano groups, fluoro and chloro are preferred halogen substituents. Specific examples of the $R^1$–$R^5$ groups are: alkyl groups such as a methyl group, an ethyl group, and a propyl group; alkenyl groups such as a vinyl group and an allyl group; aryl groups such as a phenyl group and a tolyl group; and the above groups in which a part of, or all of, the hydrogen atoms combined to the carbon atoms are substituted with halogen atoms, such as fluorine, or with a cyano group, such as a 3,3,3-trifluoropropyl group, chloromethyl group, and a 3-cyanopropyl group. It is particularly preferred, for example, that $R^2$ and $R^3$ be methyl.

The organopolysiloxane may be branched or linear and contain up to 5 triorganosilyl groups, preferably 1 to 3 such groups and particularly preferably 2 such groups.

The degree of polymerization of this organopolysiloxane is at least 2000, preferably from 3000 to 10000. Further, the organopolysiloxane can be linear, branched, or cyclic; however, linear molecules are preferred in order to obtain silicone rubber compositions with good characteristics. A compound shown by the following equation (2) is suitably utilized as an organopolysiloxane of this invention:

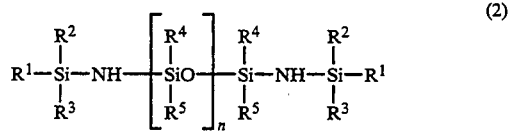 (2)

wherein n is an integer of at least 2000, preferably from 3000 to 10000.

Further, the vinyl group content in the organopolysiloxane is preferably in the range of 0.02 to 5 mol % based on the average total mole numbers of $R^1$, $R^2$, $R^3$, $R^4$ and $R^5$. When the vinyl group mole ratio is less than 0.02 mol %, the cross-linking density becomes too low, which may lead to poor rubber strength and permanent deformation under compression. On the other hand, a content of more than 5 mol % will make the cross-linking density too high, which may result in a harder rubber with a poor elongation property.

Further, component (A) may consist of one organopolysiloxane combination of two or more organopolysiloxanes.

For the synthesis of component (A), organopolysiloxane with triorganosilyl amine groups, the already known diorganopolysiloxane polymerization method can be employed. For example, this method utilizes cyclic siloxanes such as 1,1,3,3,5,5,7,7-octamethyltetrasiloxane and 1,3,5,7-tetravinyltetrasiloxane, along with a pre-polymer which possesses a triorganosilyl amine group at its end, such as 1,7-bis(trimethyl-silyl-amine)-1,1,3,3,5,5,7,7-octamethyltetrasiloxane. A polymerization catalyst, such as tetrabutyl-phosphonium hydroxide, is further added to this mixture, then the polymerization is conducted at 110° to 180° C. to obtain the organopolysiloxane.

Fine powdered silica is added to the compositions of the invention as a component (B). This fine powdered silica provides the mechanical strength properties, such as adequate hardness and tension strength, to the silicone rubber. Fine powdered silica with at least a 50 m²/g of specific surface area, preferably from 100 to 400 m²/g, is suitably employed. Examples of such fine powdered silica are a fumed silica, a sintered silica, and a precipitated silica. They can be used either alone or by combining two or more types. Further, types of silica in which the surfaces are treated by linear organopolysiloxane, cyclic organopolysiloxane, hexamethylene disilazane, or dichlorodimethyl silane may be used.

The proportion of the fine powdered silica is preferably from 3 to 50 parts (all parts being expressed by weight herein unless stated otherwise), more preferably from 3 to 30 parts, based on 100 parts of organopolysiloxane, the component (A). More than 50 parts of silica content will increase the rubber strength and the permanent deformation under compression in cured products too much. Addition of less than 3 parts results in fluidity, leading to poor process characteristics and insufficient mechanical strength.

The compositions of this invention may comprise other components as necessary. Examples of such components are pigments, dyes, anti-aging agents, anti-oxidants, antistatic agents, noninflammable agents such as antimony oxide and paraffin chloride, and thermal conductance enhancers such as boron nitride and aluminum oxide. Further, other rubber additives which are already known to be combined with silicone rubber compositions may be used at a degree which does not interfere with the original purpose of this invention. Examples of such rubber additives are: crushed silica, diatomaceous earth, iron oxide, zinc oxide, titanium dioxide, carbon black, barium oxide, magnesium oxide, cerium hydroxide, calcium carbonate, magnesium carbonate, zinc carbonate, asbestos, glass wool, powdered mica, and molten silica powder.

Preparation methods for the silicone rubber compositions of this invention are not particularly limited. For example, component (A), organopolysiloxane, and component (B), the fine powdered silica, are placed in a mixing instrument such as a kneader and processed at room temperature. A following one to five hour heat treatment at 100° to 200° C. will result in the said compositions. The ingredients alkoxy silanes, silanes/siloxanes with silanols, or water may be added to the compositions along with the component (A) and component (B) before the mixing process and the heat treatment, not after the heat treatment of the mixtures of the component (A) and component (B), in order to improve the dispersion of the fine powdered silica.

The silicone rubber compositions of this invention can be cured by the known methods, either by utilizing the hydrosilylation reaction or by vulcanization in the presence of organic peroxide catalysts.

When the hydrosilylation reaction is utilized, it employs an organohydrogen polysiloxane along with a platinum group metallic catalyst as a curing agent. The organohydrogen polysiloxane here may be any organopolysiloxane with at least two SiH groups in one molecule. It may be linear, cyclic, or branched. the SiH group may exist either at the end or in the middle of the molecule. The preferred amount of this organohydrogen polysiloxane is the equivalent to provide 0.5 to 10 moles of SiH groups, particularly 1 to 5 moles, based on one mole of alkenyl group in the component (A), organopolysiloxane.

Examples of the platinum group metallic catalysts applicable are: the fine powdered metallic platinum catalyst described in U.S. Pat. No. 2,970,150; the chloroplatinic acid catalyst described in U.S. Pat. No. 2,823,218; the platinum-hydrocarbon complex compounds described in U.S. Patent Nos. 3,159,601 and 3,159,662; the chloroplatinic acid-olefin complex compounds described in U.S. Pat. No. 3,516,946; and the platinum-vinyl siloxane complex described in U.S. Pat. Nos. 3,775,452 and 3,814,780.

The preferred amount of the platinum group metallic catalysts is the equivalent to provide 0.1 to 1000 ppm, particularly 1 to 100 ppm, of metallic platinum, based on the total amounts of the organopolysiloxane of the (A) component and the organohydrogen polysiloxane. Curing by the hydrosilylation reaction is carried out by 0.5 minutes to 5 hours of heating at 60° to 200° C.

During the curing, reaction controllers such as methyl-vinyl-cyclotetrasiloxane and acetylene alcohols may be added in order to maintain good stability during room temperature storage and an adequate pot lifetime.

On the other hand, when the silicone rubber compositions are vulcanized under the existence of organic peroxides, any organic peroxides which are commonly utilized to cure the peroxide curing type silicone rubbers may be used without limitations. Specific examples are benzoyl peroxide; bis(2,4-chlorobenzoyl)peroxide; di-t-butyl peroxide; 2,5-dimethyl-di-t-butylperoxy hexane; t-butyl perbenzoate; t-butylperoxy isopropyl carbonate; and dicumyl peroxide. These may be used alone or in combination of two or more.

The preferred proportion of the organic peroxide is usually 0.01 to 3 parts, particularly 0.05 to 1 part, based on 100 parts of the organopolysiloxane. In this method, curing is carried out by heating the compositions at 100° to 250° C. for from 5 minutes to 5 hours.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding Japanese application 4-155810, are hereby incorporated by reference.

EXAMPLES

Synthesis Example 1

7400 g of 1,1,3,3,5,5,7,7-octamethyl tetrasiloxane; 13 g of 1,3,5,7-tetramethyl-1,3,5,7-tetravinyl-tetrasiloxane; and 11.4 g of 1,7-bis(trimethyl-silyl-amine)-1,1,3,3,5,5,7,7-octamethyl-tetrasiloxane were placed in a 10-liter capacity separable flask. This mixture was heated to 110° C., then 1.4 g of tetrabutyl phosphonium hydroxide, which is a polymerization catalyst, was added. The mixture was maintained at 110° C. for three hours and organopolysiloxane was prepared. Then the temperature was raised to 170° C. in order to decompose the polymerization catalyst. While maintaining this temperature, the pressure inside of the flask was reduced to 3 mm Hg. After eliminating the lower molecular weight siloxanes for five hours, the organopolysiloxane A having an average degree of polymerization of 8000 was obtained.

Synthesis Example 2

The organopolysiloxane B having an average degree of polymerization of 8000 was obtained by a similar method as described in Synthesis Example 1, except that a 12.6 g of 1,7-bis(trimethyl-silyl-amine)-1,1,3,3,5,5,7,7-octamethyltetrasiloxane was employed instead of the 13 g of 1,3,5,7-tetramethyl-1,3,5,7-tetravinyl-tetrasiloxane and the 11.4 g of 1,7-bis(trimethyl-silyl-amine)-1,1,3,3,5,5,7,7-octa-methyl-tetrasiloxane.

Trimethyl-silyl-amine groups within the organopolysiloxanes A and B which were obtained in the said Synthesis Examples were confirmed by the following method.

Confirmation of Trimethyl-Silyl-Amine Groups

Each of the organopolysiloxanes A and B was dissolved into toluene to make 10% toluene solutions, then they were distilled at 200° C. Analysis of the distilled portions by gas chromatography confirmed that the components, besides toluene, are a trace amount of cyclic siloxanes (tetramers, pentamers, hexamers, and heptamers of dimethyl siloxane). Therefore, this analytical result confirmed that terminal groups of the organopolysiloxane molecules A and B are trimethyl-silylamine groups.

Example 1

0.1 part of water, 2 parts of methyl-phenyl polysiloxane with terminal silanol groups (with 4 degrees of polymerization) and 15 parts of AEROSIL 200 (a fumed silica manufactured by Nippon Aerosil, Ltd.) were added to the 100 parts of the organosiloxane A, which was further mixed in a kneader. A base compound I was prepared by heat treating the mixture for 2 hours at 150° C.

Example 2

A base compound II was prepared by a similar method as described in Example 1, except that a mixture of 30 parts of the organopolysiloxane A and 70 parts of the organopolysiloxane B was employed in place of the 100 parts of the organopolysiloxane A.

Comparison Example 1

A base compound III was prepared by a similar method as described in Example 1, except that the 100 parts of organopolysiloxane raw rubber, which comprises 99.825 mol % of dimethyl-siloxyl units, 0.15 mol % of methyl-vinyl-siloxyl units, and 0.025 mol % of dimethyl-vinyl-siloxyl units and of which the average degree of polymerization was 8000, was employed in place of the 100 parts of the organopolysiloxane A.

Each of the said base compounds I, II and III was filled into a ditch-type container, which is specified in JIS-A5758 for slump tests, and left at room temperature for 24 hours. Then the distance flowed down the ditch by each compound was measured. The fluidity of each base compound was expressed by the distance of flow in mm units. The results are shown in Table 1.

Further, a 0.5 part of 2,5-dimethyl-2,5-bis(t-butylperoxy)hexane was added to the 100 parts of each base compound. After uniform mixing, the mixture was press-vulcanized for 10 minutes at 170° C., then further post-vulcanized at 200° C. for 4 hours to obtain vulcanized rubber sheets. The cured physical properties of these rubber sheets were measured by following the JIS-K6301 method. The results are also summarized in Table 1.

TABLE 1

|  | Example 1 Compound I | Example 2 Compound II | Comparison Example Compound III |
| --- | --- | --- | --- |
| Fluidity (mm) | 0 No fluidity | 0 No fluidity | 9 Compound flows |
| Cured Physical Properties |  |  |  |
| Hardness JIS-A | 29 | 23 | 33 |
| Elongation (%) | 330 | 520 | 350 |
| Tensile Strength | 35 | 39 | 33 |

TABLE 1-continued

|  | Example 1 Compound I | Example 2 Compound II | Comparison Example Compound III |
|---|---|---|---|
| (kgf/cm$^2$) |  |  |  |

As explained above, the silicone rubber compositions of this invention are a non-fluidity type; therefore, they offer superior workability and formability. Further, silicone rubbers obtained by the curing of the said compositions possess superior physical properties, extremely low hardness, flexibility, and good rubber elasticity; thus, they are useful as raw materials of various products. For example, as raw materials for the products discussed in the Background of the Invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A silicone rubber composition which comprises (A) 100 parts by weight of an organopolysiloxane which is expressed by the formula (2):

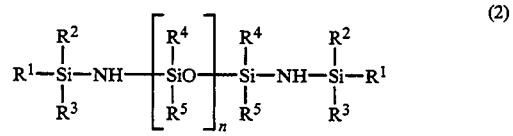

wherein n is an integer of at least 2000 and $R^1$, $R^2$, $R^3$, $R^4$ and $R^5$ are each a substituted or unsubstituted monovalent hydrocarbon group, each of which can be the same or different, wherein the vinyl group content in the $R^1$–$R^5$ groups is in the range of 0.02 to 5 mol % based on the average total mole numbers of $R^1$, $R^2$, $R^3$, $R^4$ and $R^5$;

(B) 3 to 50 parts by weight of a fine powdered silica whose specific surface area is at least 50 m$^2$/g; and (C) a curing agent selected from an organic peroxide or an organohydrogenpolysiloxane, having at least two SiH groups in one molecule, with a platinum group metallic catalyst.

2. The silicone rubber composition of claim 1, wherein the fine powdered silica (B) is presented in an amount of 3 to 30 parts by weight based on 100 parts by weight of organopolysiloxane (A).

3. A silicone rubber cured product, prepared by curing the silicone rubber composition of claim 1, having a JIS-A hardness of no more than 40.

4. A silicone rubber cured product prepared by curing the silicone rubber composition of claim 1.

5. The silicone rubber composition of claim 1, wherein each of $R^1$, $R^2$, $R^3$, $R^4$ and $R^5$ is, independently, a hydrocarbon group of 1 to 10 carbon atoms.

6. The silicone rubber composition of claim 1, wherein $R^2$ and $R^3$ are methyl.

7. The silicone rubber composition of claim 1, wherein n is 3000 to 10000.

8. The silicone rubber composition of claim 1, wherein the degree of polymerization of the organopolysiloxane is 3000 to 10000.

9. The silicone rubber composition of claim 1, wherein the specific surface area of the fine powdered silica is from 100 to 400 m$^2$/g.

* * * * *